United States Patent [19]
Mick

[11] Patent Number: 5,920,580
[45] Date of Patent: Jul. 6, 1999

[54] MULTIPLE ERROR DETECTION IN ERROR DETECTION CORRECTION CIRCUITS

[75] Inventor: John R. Mick, San Jose, Calif.

[73] Assignee: Integrated Device Technology, Inc., Santa Clara, Calif.

[21] Appl. No.: 08/615,546

[22] Filed: Mar. 11, 1996

[51] Int. Cl.[6] .................................................. G11C 29/00
[52] U.S. Cl. ...................... 371/40.3; 371/37.2; 371/37.4; 371/37.8; 371/37.11; 395/182.16
[58] Field of Search ................................. 371/37.2, 37.4, 371/37.8, 40.1, 40.3, 39.1, 37.11, 37.12, 37.5, 54, 48, 31; 364/757; 395/143, 182.16

[56] References Cited

U.S. PATENT DOCUMENTS

| | | | |
|---|---|---|---|
| 4,117,458 | 9/1978 | Burghard et al. | 371/37.2 |
| 4,236,247 | 11/1980 | Sundberg | 371/40.1 |
| 4,319,357 | 3/1982 | Bossen | 371/37.2 |
| 4,504,948 | 3/1985 | Patel | 371/40.3 |
| 4,509,172 | 4/1985 | Chen | 371/37.8 |
| 4,525,838 | 7/1985 | Patel | 371/37.4 |
| 4,683,572 | 7/1987 | Baggen et al. | 371/37 |
| 5,331,645 | 7/1994 | Miller et al. | 371/37.1 |
| 5,418,796 | 5/1995 | Price et al. | 371/39.1 |
| 5,424,971 | 6/1995 | Yang et al. | 364/757 |
| 5,570,463 | 10/1996 | Dao | 395/143 |
| 5,600,662 | 2/1997 | Zook | 371/40.1 |

OTHER PUBLICATIONS

Wicker, Stephen B., "S4EC–D4ED Error Control Systems for Computer Memory," Georgia Institute of Technology Seminar Materials, School of Elec. and Computer Eng., pp. 1–22, 35–56.

Kaneda et al., "Single Byte Error Correcting–Double Byte Error Detecting Codes for Memory Systems," IEEE Transactions on Computers, vol. 31, No. 7, pp. 596–602 Jul. 1982.

*Primary Examiner*—William Grant
*Assistant Examiner*—McDieunel Marc
*Attorney, Agent, or Firm*—Skjerven, Morrill, MacPherson, Franklin and Friel

[57] ABSTRACT

A multi-error detector uses single byte error correcting-double byte error detecting codes but detects some multiple errors including double, triple, quadruple and more errors in a code. To detect the multiple errors, the multi-error detectors uses error pointer and a syndrome which are generated by error correction circuitry. Multiple errors are indicated when the syndrome indicates an error and either none or more than one of the error pointers are set. In one embodiment, a tree of half adders has least significant output bits from the adders coupled to input terminals of subsequent adders in the tree. Circuit logic detects multiple errors from the least significant output bit of the last adder in the tree and the more significant output bits from all the adders.

27 Claims, 6 Drawing Sheets

$$H_{(80,64)} = \begin{bmatrix} 1 & 1 & 1 & 1 & 1 & 0 & 0 & 0 & 0 & 0 & T^2 & T & 1 & T^{14} & 0 & T^{14} & 1 & T & T^2 & 0 \\ T^{14} & 1 & T & T^2 & 0 & 1 & 1 & 1 & 1 & 1 & 0 & 0 & 0 & 0 & 0 & T^2 & T & 1 & T^{14} & 0 \\ T^2 & T & 1 & T^{14} & 0 & T^{14} & 1 & T & T^2 & 0 & 1 & 1 & 1 & 1 & 1 & 0 & 0 & 0 & 0 & 0 \\ 0 & 0 & 0 & 0 & 0 & T^2 & T & 1 & T^{14} & 0 & T^{14} & 1 & T & T^2 & 0 & 1 & 1 & 1 & 1 & 1 \end{bmatrix}$$

FIG. 1A

$$0 = \begin{bmatrix} 0 & 0 & 0 & 0 \\ 0 & 0 & 0 & 0 \\ 0 & 0 & 0 & 0 \\ 0 & 0 & 0 & 0 \end{bmatrix}; \quad 1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}; \quad T = \begin{bmatrix} 0 & 0 & 0 & 1 \\ 1 & 0 & 0 & 1 \\ 0 & 1 & 0 & 0 \\ 0 & 0 & 1 & 0 \end{bmatrix}$$

$$T^2 = \begin{bmatrix} 0 & 0 & 1 & 0 \\ 0 & 0 & 1 & 1 \\ 1 & 0 & 0 & 1 \\ 0 & 1 & 0 & 0 \end{bmatrix} \quad T^{14} = \begin{bmatrix} 1 & 1 & 0 & 0 \\ 0 & 0 & 1 & 0 \\ 0 & 0 & 0 & 1 \\ 1 & 0 & 0 & 0 \end{bmatrix}$$

MULTIPLE ERROR DETECTION IN ERROR DETECTION CORRECTION CIRCUITS

BACKGROUND OF THE INVENTION

1. Field of the Invention

This invention relates to methods and circuits for detecting errors in coded digital values.

2. Description of Related Art

Digital memory and communication systems use a variety of error correction coding techniques to detect and correct errors which arise during writing, storing, transmitting, or reading digital data. Single byte error correcting-double byte error detecting codes, referred to herein as SbEC-DbED codes where "b" is the number of bits in a byte, are for detection of up to two byte errors and correction of one byte in a data string. Shigeo Kaneda and Eiji Fujiwara, "Single Byte Error Correcting-Double Byte Error Detecting Codes for Memory Systems," IEEE transactions on Computers, Vol. C-31, No. 7, pp 596–602, July 1982 describes an exemplary embodiment of S4EC-D4ED coding and is incorporated by reference herein in its entirety.

S4EC-D4ED codes contain check bits which circuits or software use to locate and correct a single 4-bit byte (nibble) which contains one or more bit errors. An exemplary S4EC-D4ED code converts digital data d[0:63] containing 64 data bits d0 to d63 to an 80-bit code x[0:79] containing code bits x0 to x79. Code x[0:79] is logically divided into four modules of 20 bits. In each module, the first 16 code bits, x0 to x15, x20 to x35, x40 to x55, or x60 to x75, are equal to data bits d0 to d15, d16 to d31, d32 to d47, or d48 to d63, and the last four code bits x16 to x19, x36 to x39, x56 to x59, or x76 to x79 of each module are check bits c0 to c3, c4 to c7, c8 to c11, or c12 to c15.

A coding system using S4EC-D4ED codes generates check bits C from data D before storing or transmitting code X. Equations A.1 in the Appendix show the relations between check bits c0 to c15 and data bits do to d63 for the exemplary embodiment. An error detection-correction system receives code X, detects whether code X contains errors, and if possible, corrects an error.

Figure 1A:
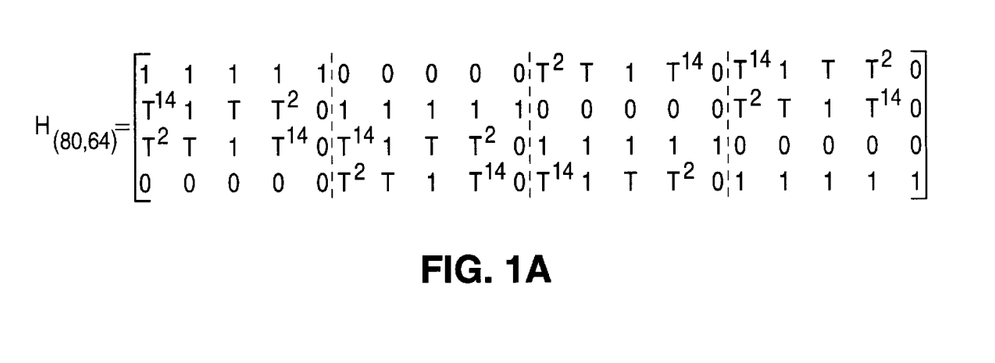
FIGS. 1A and 1B show a parity check matrix for an exemplary embodiment of single nibble error correcting-double nibble error detecting codes.
Figure 1B:
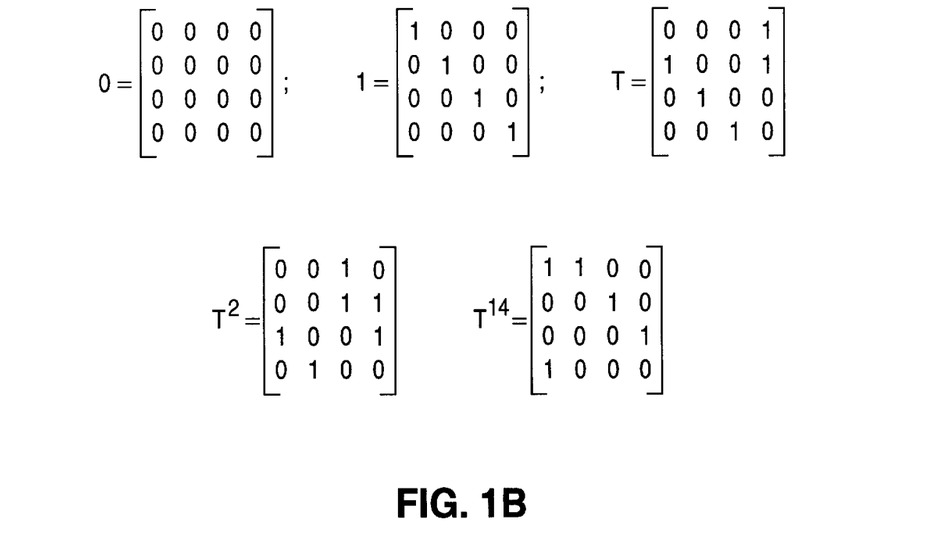

Multiplying code X and a parity check matrix E generates a syndrome s. If syndrome s is non-zero, code X contains an error. Assuming a single error is present, syndrome s indicates the location of the error and how to correct the error. FIG. 1A shows the parity check matrix $H_{(80,64)}$ for the exemplary S4EC-D4ED codes. Matrix $H_{(80,64)}$ is a 16×80 matrix; and entries 0, 1, T, $T^2$, and $T^{14}$ in FIG. 1A are the 4×4 matrices shown in FIG. 1B. Modulo 2 matrix multiplication of matrix $H_{(80,64)}$ and a column vector containing bits x0 to x79 generates the sixteen syndrome bits s0 to s15 which software or circuit logic uses to locate and correct a nibble error. To facilitate location of errors, matrix $H_{(80,64)}$ is logically partitioned into four modules, each module being a 16×20 matrix of bits; and syndrome s is partitioned into four nibbles $s_0$ to $s_3$. The four modules of matrix $H_{(80,64)}$ correspond to the four modules of code X.

Figure 2:
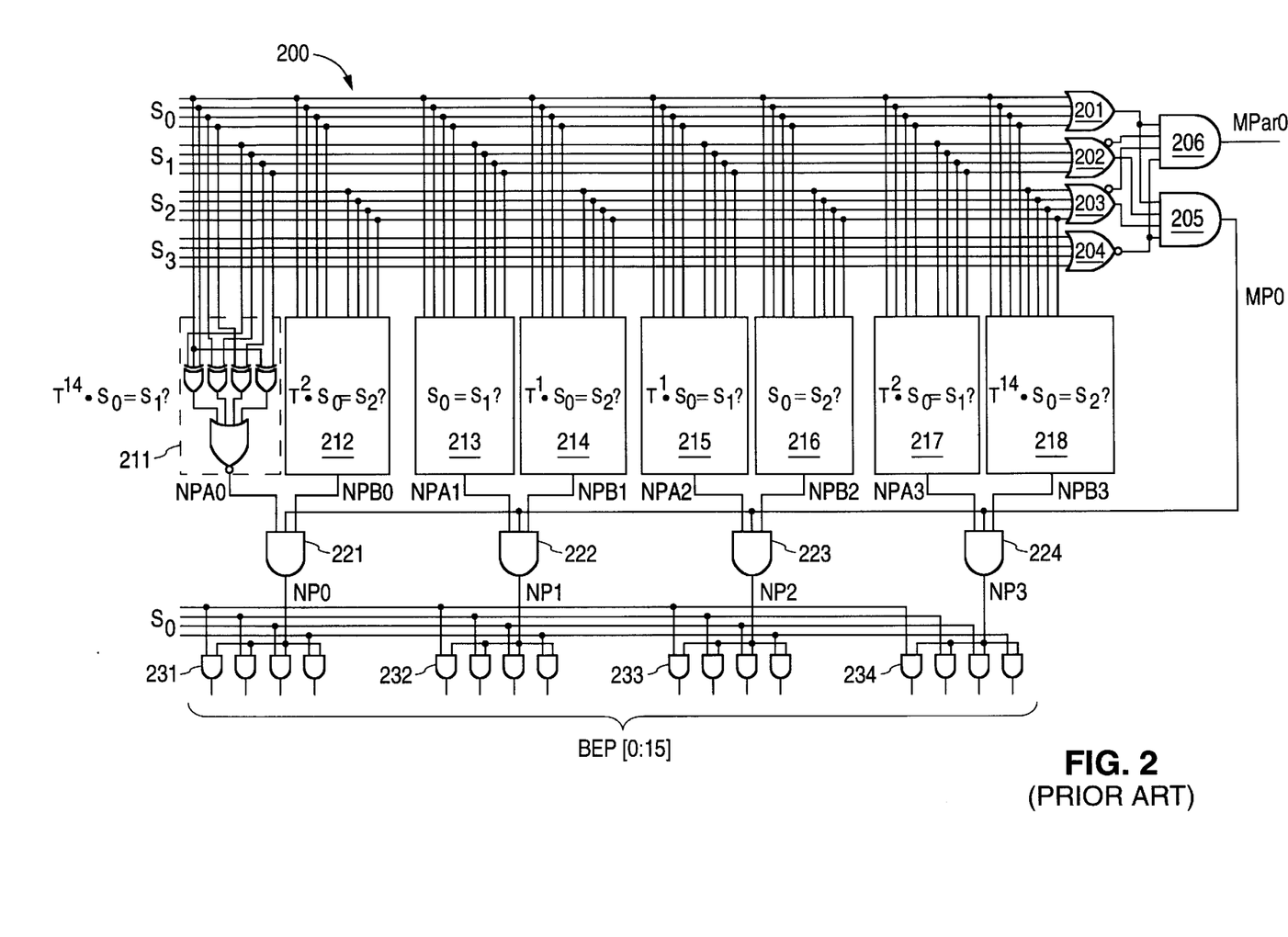
FIG. 2 shows a partial gate level diagram of a decode circuit which locates errors in a code.

FIG. 2 shows a partial gate level diagram of a module decoder which locates errors within the first module (bits x0 to x19) of code X. A complete error detection circuit contains four similar module decoders, one for each module. Gates 201 to 205 generate a signal MP0 which indicates whether an error is in the first module of code X. If the only errors in code X are in data bits d0 to d15, syndrome nibbles $s_0$, $s_1$, and $s_2$ are non-zero because the first module of matrix $H_{(80,64)}$ contains non-zero matrices which are multiplied by d0 to d15 to generate nibbles $s_0$, $s_1$, and $S_2$. However, the last four rows of the first module of matrix $H_{(80,64)}$ are zero, and nibble $S_3$ is independent of first module of code X and remains equal to zero when there are no errors in the second, third, or fourth module of code X. AND gate 205 asserts signal MP0 when each of nibbles $s_0$, $s_1$, and $S_2$ contains a non-zero bit and nibble $S_3$ is zero. This indicates that data bits d0 to d15 contains an error. If only check bits c0 to c3 contain errors, only nibble $s_0$ is non-zero because only the first four rows of the first module of matrix H contain non-zero values which are multiplied by c0 to c3 when determining syndrome s. If nibble $s_0$ is non-zero and nibbles $s_1$, $s_2$, and $S_3$ are zero, AND gate 206 asserts a signal MPar0 to indicate an error is in check bits c0 to c3.

If code X contains a single nibble error, then syndrome s satisfies equation 1, $$s = e_i \cdot h_i \quad \text{(equation 1)}$$

where $e_i$ is the nibble error in code X, $h_i$ is a set of four columns of matrix $H_{(80,64)}$, and i is an index which identifies the position of the nibble error in code X. Equation 1 imposes relations between syndrome nibbles $s_0$ to $S_3$ which differ depending on which data nibble contains the error. Logic 211 to 218 performs comparisons between nibbles $S_0$ to $S_2$ ($S_3$ is zero if the error is in the first module) to determine which relation is satisfied and determine which nibble (d[0:3], d[4:7], d[8:11], or d[12:15]) within the first module of code X contains the error. If signal MP0 is asserted, AND gates 221 to 224 assert one of nibble pointer signals NP0 to NP3 to identify which data nibble (d[0:3], d[4:7], d[8:11], or d[12:15]) contains the error. Syndrome nibble so provides four bits to correct the nibble error in the first module. Four sets 231 to 234 of four AND gates assert bit error pointer signals BEP[0:15] to indicate which of the bits in the first module of code X require correction.

The combination of syndrome s being non-zero and none of the nibble pointers signals being asserted indicates a double error in code X. However, this does not correctly indicate all possible multiple errors. Error detection is desired which detects a greater proportion of multiple errors including, data having errors in two, three, or more nibbles which may be in one or more modules.

SUMMARY OF THE INVENTION

In accordance with the invention, single nibble error correcting-double nibble error detecting codes are used to detect multiple errors including double errors, triple errors, quadruple errors, etc. Embodiments of the invention by detecting more multiple (i.e. uncorrectable) errors provide high data reliability. Multiple errors are detected by checking whether a syndrome is non-zero and whether exactly one error pointer is set to indicate the location of an error. If the syndrome is non-zero and either no error pointers are set or more than one error pointer is set then a code from which the error pointers were generated contains multiple errors which cannot be corrected.

In alternative embodiments, single nibble error correcting-double nibble error detecting codes are replaced with SbEC-DbED codes for groups containing any number of bits b; and multiple group errors including double errors, triple errors, quadruple errors, etc. are detected.

In one embodiment of the invention, circuitry which determines whether exactly one error pointer is set includes a tree of adders. Each adder adds a set of 1-bit addends to generate a multi-bit sum. For example, in one embodiment, each adder adds three 1-bit values to generate a 2-bit sum.

Coupling the output terminal for the least significant bit of the multi-bit sum from an adder to an input terminal of another adder links the adders to form the tree where the least significant output bit from each adder except a last adder in the tree is coupled to an input terminal of another adder in the tree. Error pointers are asserted to adder input terminals which are not coupled to ground or another adder.

If no error pointers are set, all of the outputs from the adders are low. If one error pointer is set, one or more of the adders, including the last adder in the tree, has a least significant output bit which is high; and all other output bits are low. If multiple error pointers are set, at least one of the adders asserts an output bit other than a least significant bit. Circuit logic coupled to the more significant bits from all the adders and to the least significant bit from the last adder can detect the cases which indicate multiple errors and assert a signal indicating multiple errors.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, an error detection/correction circuit contains a multi-error detector which detects multiple errors in a code value. The multi-error detector is typically in a circuit which contains error correction logic that uses a syndrome to set an error pointer for a single nibble error. The multi-error detector asserts a signal indicating multiple errors if the syndrome is not zero and error correction logic generates either no error pointer or multiple error pointers.

Figure 3:
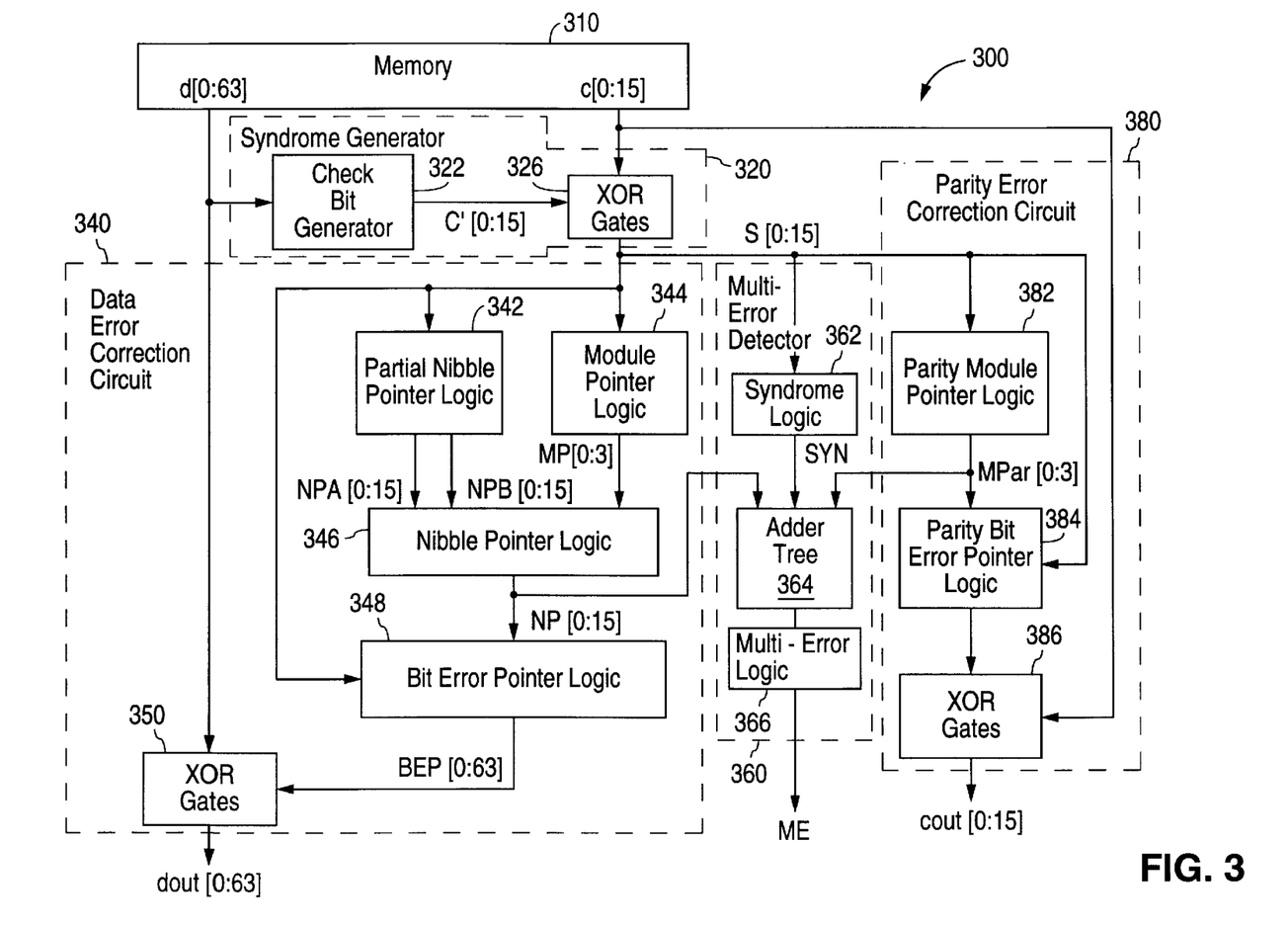
FIG. 3 shows a block error detection/correction circuit in accordance with an embodiment of the invention.

FIG. 3 shows an exemplary embodiment of an error detection/correction circuit 300 which uses S4EC-D4ED codes described in "Single Byte Error Correcting-Double Byte Error Detecting Codes for Memory Systems" which is incorporated by reference above. Error detection/correction circuit 300 includes a multi-error detector 360 and error correction circuits 340 and 380 which detect and/or correct errors in a code X.

Code X includes data d[0:63] and a check code c[0:15]; and if code X is error free, data d[0:63] and check code c[0:15] are related to each other as indicated by equations A.1 in the Appendix. In the embodiment shown, a memory 310, in which code X is stored, provides code X for error detection and correction. In an alternative embodiment, the source of code X is a receiver in a communications system which receives a digital signal via a channel, and detection/correction circuit 300 detects and corrects channel errors. More generally, error detection/correction circuit 300 can be used with any source of coded data.

Memory 310 asserts code X (data d[0:63] and check bits c[0:15]) to a syndrome generator 320. Syndrome generator 320 contains a check bit generator 322 and a set of XOR gates 326. Check bit generator 322 generates set of check bits c'[0:15] from data d[0:63]. If code X is error free, check bits c'[0:15] are identical to check bits c[0:15]. XOR gates 326 generate syndrome bits s[0:15], where each bit s0 to s15 is the exclusive OR of a corresponding one of check bits c0 to c15 and a corresponding one of check bits c0' to c15', and assert syndrome bits s[0:15] to a data error correction circuit 340, a multi-error detection circuit 360, and a parity error correction circuit 380.

Data error correction circuit 340 contains four module decoders which are similar to module decoder 200 of FIG. 2. In particular, module pointer logic 344 generates a module pointer MP[0:3] which includes bits MP0, MP1, MP2, and MP3. Module pointer bit MP0 is generated from syndrome bits s[0:15] using circuit logic 201 to 205 of FIG. 2. Similar circuit logic implements the equations A.2 of the Appendix, to generate module pointer bits MP1 to MP3. Partial nibble pointer logic 342 corresponds to logic 211 to 218 in FIG. 2 and generates partial nibble pointers NPA[0:15] and NPB[0:15] which have values defined by equations A.4 in the Appendix.

Nibble pointer logic 346 includes sixteen 3-input AND gates (not shown). Each AND gate corresponds to an index i within a range between 0 and 15, has first and second input terminals coupled to receive partial nibble pointers NPAi and NPBi, and a third input terminal coupled to receive a module pointer MPj where j is the integer part of i/4.

Bit error pointer logic 348 contains 64 AND gates, one set of four AND gates for each nibble pointer NP[0:15], and generates a 64-bit bit error pointer signal BEP[0:63]. Each of the AND gates in bit error pointer logic 348 has a first input terminal coupled to one of syndrome bits s[0:15] and a second terminal coupled to a corresponding one of nibble pointers NP[0:15]. The first four sets of AND gates correspond to nibble pointers NP0 to NP3 and have first terminals coupled to syndrome bits s0 to s3 as shown for AND gates sets 231 to 234 of FIG. 2. The fourth to seventh sets of AND gates correspond to nibble pointers NP4 to NP7, and the four AND gates in each set have respective first terminals coupled to a corresponding set of syndrome bits syndrome bits s4 to s7. The eighth to eleventh sets of AND gates correspond to nibble pointers NP8 to NP11 and syndrome bits s8 to s11. The twelfth to fifteenth sets of AND gates correspond to nibble pointers NP12 to NP15 and syndrome bits s12 to s15.

XOR gates 350 perform an exclusive OR of data bits d[0:63] and bit error pointers BEP[0:63] to generate output data dout[0:63]. In the case of a single nibble error in data d[0:63], only one of nibble pointers NP[0:15] is asserted; and the exclusive OR operation removes errors in the nibble indicated by the asserted nibble pointer.

Parity error correction circuit 380 includes parity module pointer logic 382, parity bit error pointer logic 384, and XOR gates 386. Parity module pointer logic generates a signal MPar[0:3] which is define by equations A.3 in the Appendix. Logic gates 201 to 204 and 206 of FIG. 2 provide an example of the logic required to generate parity module pointer MPar0. Signal MPar[0:3] indicates which module, and therefore which nibble, of the check code contains an error. Parity bit error pointer logic 384 and XOR gates 386 change the nibble indicated by signal MPar[0:3] to generate a corrected check code cout[0:15]. Alternatively, parity bit error pointer logic 384 and XOR gates 386 are eliminated, and check code cout[0:15] is set equal to check code c'[0:15] from check code generator 322.

Multi-error detector 360 receives nibble pointer NP[0:15] from nibble pointer logic 346, parity module pointer MPar[0:3] from parity bit error pointer logic 382, and syndrome s from syndrome generator 320. If syndrome s is non-zero and if the number of bits set in nibble pointer NP[0:15] and parity module pointer MPar[0:3] is not one, multi-error detector 360 detects errors in multiple nibbles of code X and asserts a signal ME.

Figure 4:
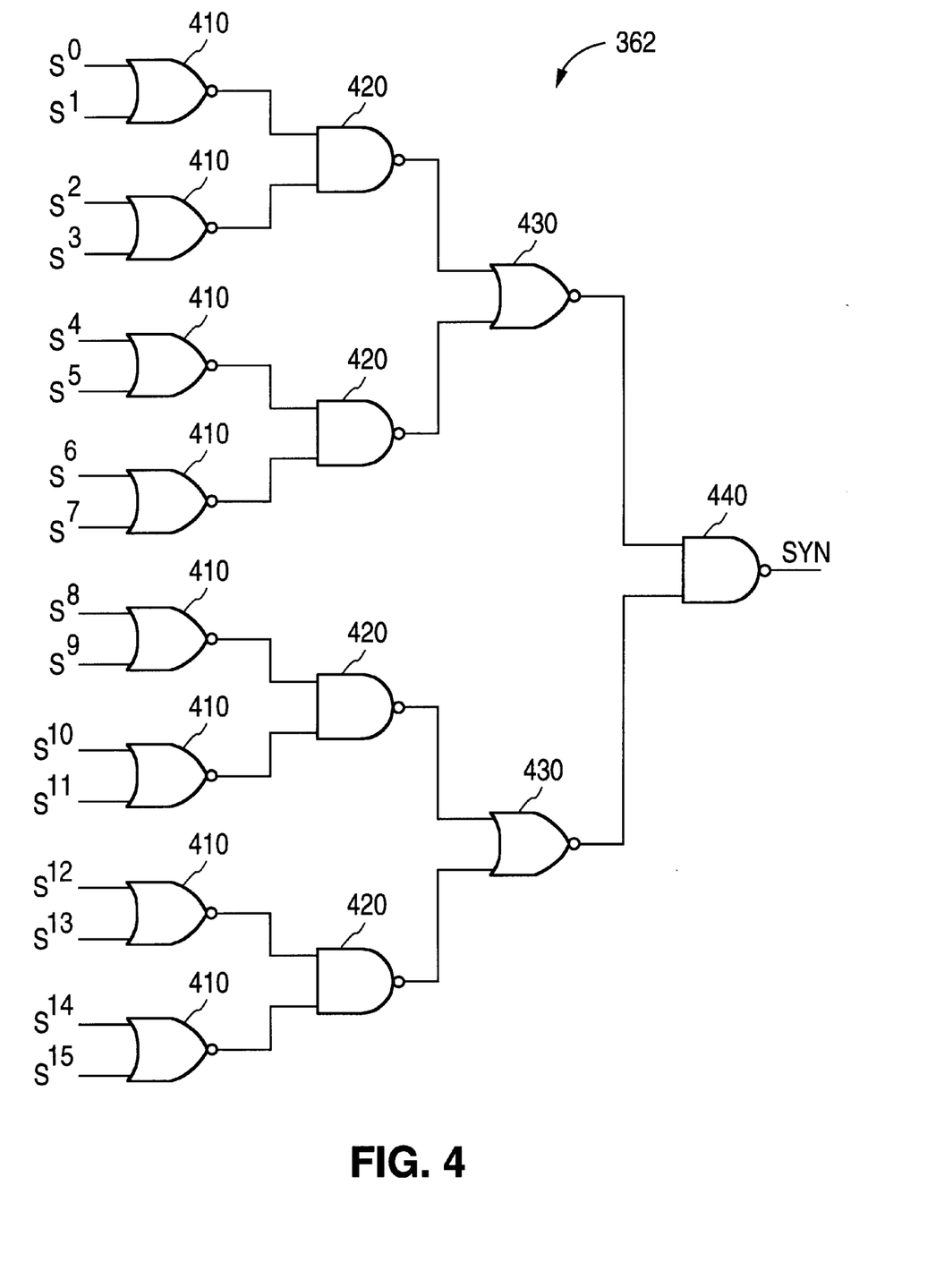
FIG. 4 shows a gate level diagram of a circuit for determining whether a syndrome is zero.

Syndrome logic 362 is a portion of multi-error detector 360 that provides a signal SYN to indicate whether syndrome s is non-zero. FIG. 4 shows a circuit diagram of an exemplary embodiment of syndrome logic 362 which is a tree containing four levels, NOR gates 410, NAND gates 420, NOR gates 430, and a NAND gate 440. If any of the bits s0 to s15 of syndrome s is one (high), output signals from at least one of NOR gates 410 is low (zero). This low output signal causes at least one output signal from NAND gates 420 to be high, and in response, one of the output signals from NOR gates 430 is low. NAND gate 440 asserts signal SYN high if either output signal from NOR gates 430 is low. Accordingly, logic 362 asserts signal SYN if any of the syndrome bits s0 to s15 is one (not zero). If syndrome s is zero, output signals from all NOR gates 410 are high, output signals from all NAND gates 420 are low, output signals from both NOR gates 430 are high, and signal SYN is low.

As will be appreciated by those skilled in the art, syndrome logic 362 which generates a signal in accordance with equation A.7 of the Appendix can be implemented using many alternative circuits. For example, a single OR gate with sixteen inputs or a four level tree of two input OR gates can provide signal SYN. Logic 362 is one possible embodiment of such circuitry.

Figure 5:
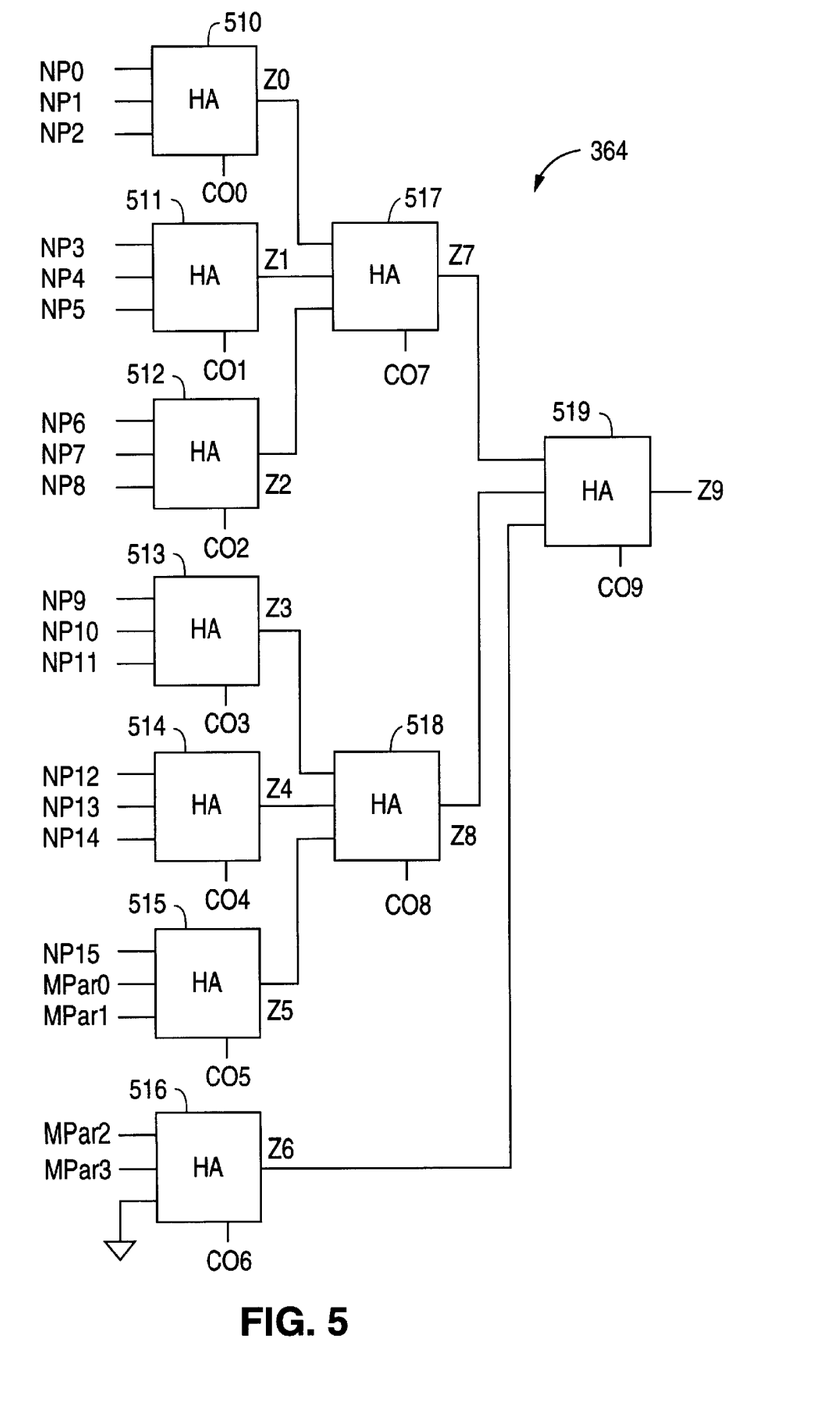
FIG. 5 shows a block diagram of a tree of adders.
Figure 6:
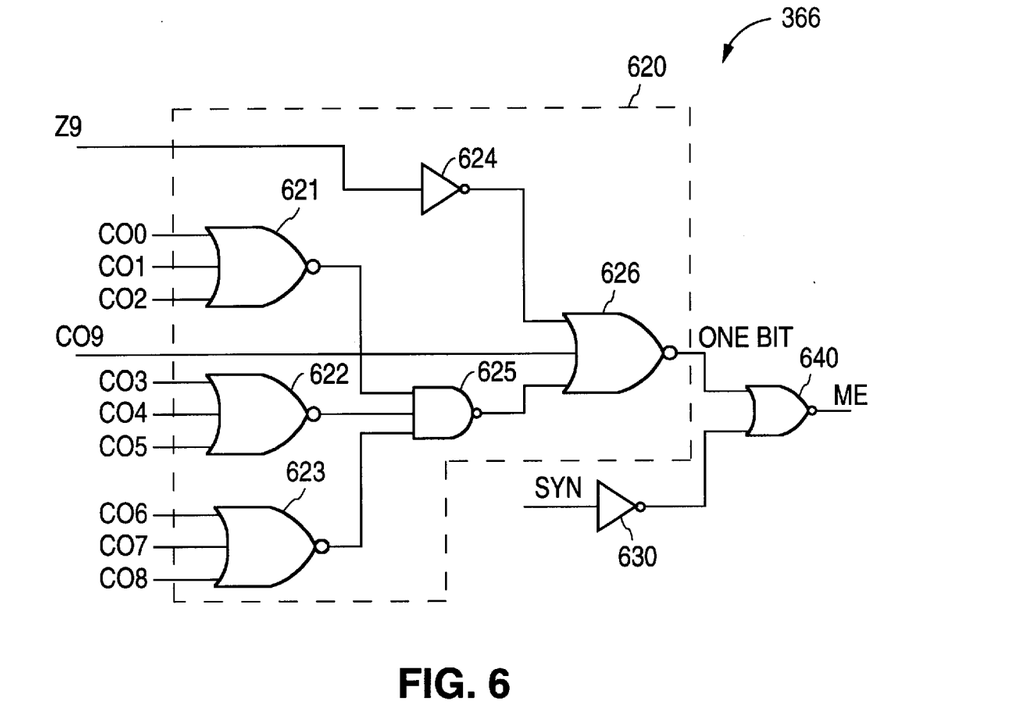
FIG. 6 shows a logic circuit which generates a signal indicating multiple errors in a code.

In addition to circuit logic 362 for determining whether syndrome s is non-zero, multi-error detector 360 contains circuitry for determining whether only one bit in signals NP[0:15] and MPar[0:3] is set. FIGS. 5 and 6 show an embodiment of a circuit which determines whether only one bit in signals NP[0:15] and MPar[0:3] is set and if not, asserts signal ME. In the exemplary embodiment of FIGS. 5 and 6, signals NP[0:15] and MPar[0:3] are asserted to a tree 364 of adders 510 to 519, shown in FIG. 5, which generate bit signals Z9 and CO0 to CO9. Logic 366 shown in FIG. 6 uses signals CO0 to CO9 and Z9 to determine whether only one of the bits from signals NP[O:15] and MPar[0:3] is high.

Figure 7:
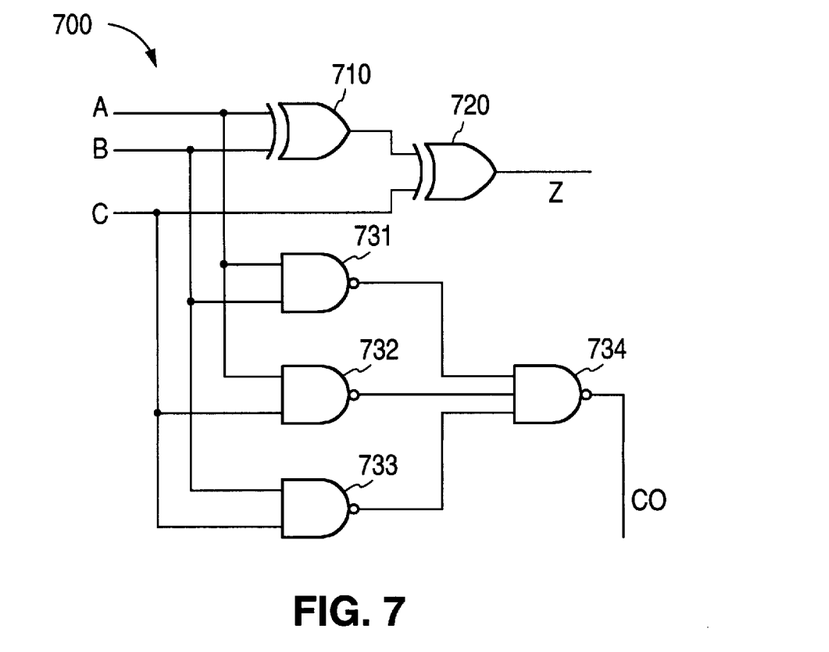
FIG. 7 shows a gate level circuit diagram of an adder.

FIG. 7 shows an example embodiment of an adder 700 which can be used as adders 510 to 519. Other adder circuits can be used in alternative embodiments. Adder 700 adds three 1-bit values to generate a 2-bit sum. Three input signals A, B, and C represent the 1-bit addends, and two output signals Z and CO represent the sum of the addends, where signal Z represents the least significant bit of the sum, and signal CO represents the most significant bit of the sum. In adder 700, XOR gates 710 and 720 assert signal Z high if an odd number of signals A, B, and C are high, and NAND gates 731 to 734 assert signal CO if two or more of signals A, B, and C are high.

In FIG. 5, adders 510 to 516 have input terminals coupled to receive signals NP[0:15] and MPar[0:3]. Since signals NP[0:15] and MPar[0:3] include a total of 20 bits, one of the adders, adder 516, has a third input terminal coupled to ground. Adder 516 acts as a 2-bit adder and in an alternative embodiment of the invention could be replaced by an adder which adds two single bit values to generate a 2-bit value.

Adders 517 and 518 receive signals Z0 to Z6 which are the least significant bits of the sums from adders 510 to 515. Adder 519 adds bit signals Z6 to Z8 from adders 516 to 518 to provide bit signal Z9. If none of the bits in signals NP[0:15] and MPar[0:3] are set high, all of the output signals Z0 to Z9 and CO0 to CO9 from adders 510 to 519 are low.

If only one bit in signals NP[0:15] and MPar[0:3] is high, only one input signal to adders 510 to 516 is high and only one of signals Z0 to Z6 is asserted high. Since Z0 to Z5 are the input bits to adders 517 and 518, exactly one of signals Z6 to Z8 is high. Accordingly, signal Z9 from adder 519 is high. None of signals CO0 to CO9 is asserted high because at most one input to any of adders 510 to 519 is high.

If more than one bit in signals NP[0:15] and MPar[0:3] is high, at least one of adders 510 to 519 asserts a carry signal CO0 to CO9. With more than one input bit high, either two input signals to one of adders 510 to 516 are high, or at least two separate adders 510 to 516 receive high input signals. In the former case, one of adders 510 to 516 asserts a corresponding signal CO0 to CO6. In the latter case, the two high bits propagate through tree 364 until at least one of adders 517 to 519 receives two high input bits and asserts a corresponding signal CO7 to CO9.

In alternative embodiments of the invention, tree 364 can be replaced with a tree containing adders capable of summing two, four, or more 1-bit values to generate a multi-bit signal representing a sum of the one bit values. Generally, the input terminals of each adder in the tree are coupled to ground, to an error pointer, or to the least significant output bit from another adder in the tree; and least significant bits from every adder except a last adder in the tree are coupled to inputs of other adders. In this configuration, the last adder generates a least significant bit which indicates whether the number of error pointers is odd. If more than one error pointer is high, two or more of the high bits propagating toward the last adder in the tree will eventually reach the same adder and cause an output bit other than the least significant bit to be high. This occurrence indicates a multiple error. If none of the error pointers are high, all of the output bits from the adders are low, which when combined with a non-zero syndrome also indicates multiple errors.

Logic 620 of FIG. 6 asserts a signal ONEBIT to indicate exactly one error pointer in signals NP[0:15] and MPar[0:3] is set. A NOR gate 626 asserts signal ONEBIT high if signal Z9 is high and none of signals CO0 to CO9 is high. Otherwise, signal ONEBIT is low. A NOR gate 640 asserts signal ME high if signal ONEBIT is low and signal SYN is low. Signal ME being asserted indicates that code X contains multiple errors. Multi-error detector 360 detects more cases of multiple errors than would a system which just detects double errors because multi-error detector 360 can detect cases were code X contains three or more nibbles containing errors. Signal ME therefore flags a high percentage of uncorrectable errors.

Although the present invention has been described with reference to particular embodiments, the description is only an example of the invention's application and should not be taken as a limitation. In particular, embodiments which provide for 80-bit codes use 20 nibble pointers to identify nibbles errors. Alternatively, 80-bit codes and 4-bit nibbles can be replaced by any size code and groups of bits if the number of error pointers and the adder tree used in some embodiments of the invention are adapted to match the number of error pointers for the groups. Various other adaptations and combinations of features of the embodiments disclosed are within the scope of the present invention as defined by the following claims.

Appendix

This Appendix describes single nibble error correcting-double nibble error detecting codes used with an exemplary embodiment of the invention. Equations A.1 define the values of check bits c[0:15] in terms of input data d[0:63].

Equations A.1:

$c0 = d0$ xor $d4$ xor $d8$ xor $d12$ xor $d34$ xor $d39$ xor $d40$ xor $d44$ xor $d45$ xor $d48$ xor $d49$ xor $d52$ xor $d59$ xor $d62$ $c1 = d1$ xor $d5$ xor $d9$ xor $d13$ xor $d34$ xor $d35$ xor $d36$ xor $d39$ xor $d41$ xor $d46$ xor $d50$ xor $d53$ xor $d56$ xor $d59$ xor $d62$ xor $d63$ $c2 = d2$ xor $d6$ xor $d10$ xor $d14$ xor $d32$ xor $d35$ xor $d37$ xor $d42$ xor $d47$ xor $d51$ xor $d54$ xor $d57$ xor $d60$ xor $d63$ $c3 = d3$ xor $d7$ xor $d11$ xor $d15$ xor $d33$ xor $d38$ xor $d43$ xor $d44$ xor $d48$ xor $d55$ xor $d58$ xor $d61$ $c4 = d0$ xor $d1$ xor $d4$ xor $d11$ xor $d14$ xor $d16$ xor $d20$ xor $d24$ xor $d28$ xor $d50$ xor $d55$ xor $d56$ xor $d60$ xor $d61$ $c5 = d2$ xor $d5$ xor $d8$ xor $d11$ xor $d14$ xor $d15$ xor $d17$ xor $d21$ xor $d25$ xor $d29$ xor $d50$ xor $d51$ xor $d52$ xor $d55$ xor $d57$ xor $d62$ $c6 = d3$ xor $d6$ xor $d9$ xor $d12$ xor $d15$ xor $d18$ xor $d22$ xor $d26$ xor $d30$ xor $d48$ xor $d51$ xor $d53$ xor $d58$ xor $d63$ $c7 = d0$ xor $d7$ xor $d10$ xor $d13$ xor $d19$ xor $d23$ xor $d27$ xor $d31$ xor $d49$ xor $d54$ xor $d59$ xor $d60$ $c8 = d2$ xor $d7$ xor $d8$ xor $d12$ xor $d13$ xor $d16$ xor $d17$ xor $d20$ xor $d27$ xor $d30$ xor $d32$ xor $d36$ xor $d40$ xor $d44$ $c9 = d2$ xor $d3$ xor $d4$ xor $d7$ xor $d9$ xor $d14$ xor $d18$ xor $d21$ xor $d24$ xor $d27$ xor $d30$ xor $d31$ xor $d33$ xor $d37$ xor $d41$ xor $d45$ $c10 = d0$ xor $d3$ xor $d5$ xor $d10$ xor $d15$ xor $d19$ xor $d22$ xor $d25$ xor $d28$ xor $d31$ xor $d34$ xor $d38$ xor $d42$ xor $d46$ $c11 = d1$ xor $d6$ xor $d11$ xor $d12$ xor $d16$ xor $d23$ xor $d26$ xor $d29$ xor $d35$ xor $d39$ xor $d43$ xor $d47$ $c12 = d18$ xor $d23$ xor $d24$ xor $d28$ xor $d29$ xor $d32$ xor $d33$ xor $d36$ xor $d43$ xor $d46$ xor $d48$ xor $d52$ xor $d56$ xor $d60$ $c13 = d18$ xor $d19$ xor $d20$ xor $d23$ xor $d25$ xor $d30$ xor $d34$ xor $d37$ xor $d40$ xor $d43$ xor $d46$ xor $d47$ xor $d49$ xor $d53$ xor $d57$ xor $d61$ $c14 = d16$ xor $d19$ xor $d21$ xor $d26$ xor $d31$ xor $d35$ xor $d38$ xor $d41$ xor $d44$ xor $d47$ xor $d50$ xor $d54$ xor $d58$ xor $d62$ $c15 = d17$ xor $d22$ xor $d27$ xor $d28$ xor $d32$ xor $d39$ xor $d42$ xor $d45$ xor $d51$ xor $d55$ xor $d59$ xor $d63$ Equations A.2 define the values of module pointers MP[0:3] in terms of syndrome s[0:15].

Equations A.2:

| | |
|---|---|
| MP0 = | (s0 + s1 + s2 + s3) (s4 + s5 + s6 + s7) (s8 + s9 + s10 + s11) (Not (s12 + s13 + s14 + s15)) |
| MP1 = | (Not (s0 + s1 + s2 + s3)) (s4 + s5 + s6 + s7) (s8 + s9 + s10 + s11) (s12 + s13 + s14 + s15) |
| MP2 = | (s0 + s1 + s2 + s3) (Not (s4 + s5 + s6 + s7)) (s8 + s9 + s10 + s11) (s12 + s13 + s14 + s15) |
| MP3 = | (s0 + s1 + s2 + s3) (s4 + s5 + s6 + s7) (Not (s8 + s9 + s10 + s11)) (s12 + s13 + s14 + s15) |

Equations A.3 define parity pointers MPar[0:3] which indicate errors in check code nibbles.

Equations A.3:

| | |
|---|---|
| MPar0 = | (s0 + s1 + s2 + s3) (Not(s4 + s5 + s6 + s7)) (Not (s8 + s9 + s10 + s11)) (Not(s12 + s13 + s14 + s15)) |
| MPar1 = | (Not(s0 + s1 + s2 + s3)) (s4 + s5 + s6 + s7) (Not(s8 + s9 + s10 + s11)) (Not(s12 + s13 + s14 + s15)) |
| MPar2 = | (Not(s0 + s1 + s2 + s3)) (Not(s4 + s5 + s6 + s7)) (s8 + s9 + s10 + s11) (Not(s12 + s13 + s14 + s15)) |
| MPar3 = | (Not(s0 + s1 + s2 + s3)) (Not(s4 + s5 + s6 + s7)) (Not (s8 + s9 + s10 + s11)) (s12 + s13 + s14 + s15) |

Equations A.4 define partial nibble pointers NPA[0:15] and NPB[0:15].

Equations A.4:

| | |
|---|---|
| NPA0 = | (Not ((s0 xor s1 xor s4) + (s2 xor s5) + (s3 xor s6) + (s0 xor s7))) |
| NPB0 = | (Not ((s2 xor s8) + (s2 xor s3 xor s9) + (s0 xor s3 xor s10) + (s1 xor s11))) |
| NPA1 = | (Not ((s0 xor s4) + (s1 xor s5) + (s2 xor s6) + (s3 xor s7))) |
| NPB1 = | (Not ((s3 xor s8) + (s0 xor s3 xor s9) + (s1 xor s10) + (s2 xor s11))) |
| NPA2 = | (Not ((s3 xor s4) + (s0 xor s3 xor s5) + (s1 xor s6) + (s2 xor s7))) |
| NPB2 = | (Not ((s0 xor s8) + (s1 xor s9) + (s2 xor s10) + (s3 xor s11))) |
| NPA3 = | (Not ((s2 xor s4) + (s2 xor s3 xor s5) + (s0 xor s3 xor s6) + (s1 xor s7))) |
| NPB3 = | (Not ((s0 xor s1 xor s8) + (s2 xor s9) + (s3 xor s10) + (s0 xor s11))) |
| NPA4 = | (Not ((s4 xor s5 xor s8) + (s6 xor s9) + (s7 xor s10) + (s4 xor s11))) |
| NPB4 = | (Not ((s6 xor s12) + (s6 xor s7 xor s13) + (s4 xor s7 xor s14) + (s5 xor s15))) |
| NPA5 = | (Not ((s4 xor s8) + (s5 xor s9) + (s6 xor s10) + (s7 xor s11))) |
| NPB5 = | (Not ((s7 xor s12) + (s4 xor s7 xor s13) + (s5 xor s14) + (s6 xor s15))) |
| NPA6 = | (Not ((s7 xor s8) + (s4 xor s7 xor s9) + (s5 xor s10) + (s6 xor s11))) |

Equations A.4:

| | |
|---|---|
| NPB6 = | (Not ((s4 xor s12) + (s5 xor s13) + (s6 xor s14) + (s7 xor s15))) |
| NPA7 = | (Not ((s6 xor s8) + (s6 xor s7 xor s9) + (s4 xor s7 xor s10) + (s5 xor s11))) |
| NPB7 = | (Not ((s4 xor s5 xor s12) + (s6 xor s13) + (s7 xor s14) + (s4 xor s15))) |
| NPA8 = | (Not ((s8 xor s9 xor s12) + (s10 xor s13) + (s11 xor s14) + (s8 xor s15))) |
| NPB8 = | (Not ((s10 xor s0) + (s10 xor s11 xor s1) + (s8 xor s11 xor s2) + (s9 xor s3))) |
| NPA9 = | (Not ((s8 xor s12) + (s9 xor s13) + (s10 xor s14) + (s11 xor s15))) |
| NPB9 = | (Not ((s11 xor s0) + (s8 xor s11 xor s1) + (s9 xor s2) + (s10 xor s3))) |
| NPA10 = | (Not ((s11 xor s12) + (s8 xor s11 xor s13) + (s9 xor s14) + (s10 xor s15))) |
| NPB10 = | (Not ((s8 xor s0) + (s9 xor s1) + (s10 xor s2) + (s11 xor s3))) |
| NPA11 = | (Not ((s10 xor s12) + (s10 xor s11 xor s13) + (s8 xor s11 xor s14) + (s9 xor s15))) |
| NPB11 = | (Not ((s8 xor s9 xor s0) + (s10 xor s1) + (s11 xor s2) + (s8 xor s3))) |
| NPA12 = | (Not ((s12 xor s13 xor s0) + (s14 xor s1) + (s15 xor s2) + (s12 xor s3))) |
| NPB12 = | (Not ((s14 xor s4) + (s14 xor s15 xor s5) + (s12 xor s15 xor s6) + (s13 xor s7))) |
| NPA13 = | (Not ((s12 xor s0) + (s13 xor s1) + (s14 xor s2) + (s15 xor s3))) |
| NPB13 = | (Not ((s15 xor s4) + (s12 xor s15 xor s5) + (s13 xor s6) + (s14 xor s7))) |
| NPA14 = | (Not ((s15 xor s0) + (s12 xor s15 xor s1) + (s13 xor s2) + (s14 xor s3))) |
| NPB14 = | (Not ((s12 xor s4) + (s13 xor s5) + (s14 xor s6) + (s15 xor s7))) |
| NPA15 = | (Not ((s14 xor s0) + (s14 xor s15 xor s1) + (s12 xor s15 xor s2) + (s13 xor s3))) |
| NPB15 = | (Not ((s12 xor s13 xor s4) + (s14 xor s5) + (s15 xor s6) + (s12 xor s7))) |

A logical AND of partial nibble pointers NPA[0:3] and NPB[0:3] and the module pointers MP0 generates nibble pointers NP[0:3]. A logical AND of partial nibble pointers NPA[4:7] and NPB[4:7] and the module pointers MP1 generates nibble pointers NP[4:7]. A logical AND of partial nibble pointers NPA[8:11] and NPB[8:11] and the module pointers MP2 generates nibble pointers NP[8:11]. A logical AND of partial nibble pointers NPA[12:15] and NPB[12:15] and the module pointers MP3 generates nibble pointers.

Output data dout[0:63] is the XOR of input data d[0:63] and bit error pointers BEP[0:63] are defined in equations A.5.

Equations A.5
BEP[0:3]=NP0 and s[0:3]
BEP[4:7]=NP1 and s[0:3]
BEP[8:11]=NP2 and s[0:3]
BEP[12:15]=NP3 and s[0:3]
BEP[16:19]=NP4 and s[4:7]
BEP[20:23]=NP5 and s[4:7]
BEP[24:27]=NP6 and s[4:7]
BEP[28:31]=NP7 and s[4:7]
BEP[32:35]=NP8 and s[8:11]
BEP[36:39]=NP9 and s[8:11]
BEP[40:43]=NP10 and s[8:11]
BEP[44:47]=NP11 and s[8:11]
BEP[48:51]=NP12 and s[12:15]
BEP[52:55]=NP13 and s[12:15]
BEP[56:59]=NP14 and s[12:15]
BEP[60:63]=NP15 and s[12:15]

Equation A.6 indicates the condition for generating signal ME which indicates multiple errors.

Equation A.6
ME=(s0+s1+s2+s3+s4+s5+s6+s7+s8+s9+s10+s11 s12+s13+s14+s15) (Not (NP0(NP1/NP2/NP3/NP4/NP5/NP6/NP7/NP8/NP9/NP10/NP11/NP12/NP13/NP14/NP15/Mpar0/MPar1/MPar2/MPar3/)+NP1(NP0/NP2/NP3/NP4/NP5/NP6/NP7/NP8/NP9/NP10/NP11/NP12/NP13/NP14/NP15/MPar0/MPar1/MPar2/MPar3/)+NP2(NP0/NP1/NP3/NP4/NP5/NP6/NP7/NP8/NP9/NP10/NP11/NP12/NP13/NP14/NP15/MPar0/MPar1/MPar2/MPar3/)+NP3(NP0/NP1/NP2/NP4/NP5/NP6/NP7/NP8/NP9/NP10/NP11/NP12/NP13/NP14/NP15/MPar0/MPar1/MPar2/MPar3/)+NP4(NP0/NP1/NP2/NP3/NP5/NP6/NP7/NP8/NP9/NP10/NP11/NP12/NP13/NP14/NP15/MPar0/MPar1/MPar2/MPar3/)+NP5(NP0/NP1/NP2/NP3/NP4/NP6/NP7/NP8/NP9/NP10/NP11/NP12/NP13/NP14/NP15/MPar0/MPar1/MPar2/MPar3/)+NP6(NP0/NP1/NP2/NP3/NP4/NP5/NP7/NP8/NP9/NP10/NP11/NP12/NP13/NP14/NP15/MPar0/MPar1/MPar2/MPar3/)+NP7(NP0/NP1/NP2/NP3/NP4/NP5/NP6/NP8/NP9/NP10/NP11/NP12/nP13/NP14/NP15/MPar0/MPar1/MPar2/MPar3/)+NP8(NP0/NP1/NP2/NP3/NP4/NP5/NP6/NP7/NP9/NP10/NP11/NP12/NP13/NP14/NP15/MPar0/MPar1/MPar2/MPar3/)+NP9(NP0/NP1/NP2/NP3/NP4/NP5/NP6/NP7/NP8/NP10/NP11/NP12/NP13/NP14/NP15/MPar0/MPar1/MPar2/MPar3/)+NP10(NP0/NP1/NP13/NP14/NP15/MPar0/MPar1/MPar2/MPar3/)+NP11(NP0/NP1/NP2/NP3/NP4/NP5/NP6/NP7/NP8/NP9/NP10/NP12/NP13/NP14/NP15/MPar0/MPar1/MPar2/MPar3/)+NP12(NP0/NP1/NP2/NP3/NP4/NP5/NP6/NP7/NP8/NP9/NP10/NP11/NP13/NP14/NP15/MPar0/MPar1/MPar2/MPar3/)+NP13(NP0/NP1/NP2/NP3/NP4/NP5/NP6/NP7/NP8/NP9/NP10/NP11/NP12/NP14/NP15/MPar0/MPar1/MPar2/MPar3/)+NP14(NP0/NP1/NP2/NP3/NP4/NP5/NP6/NP7/NP8/NP9/NP10/NP11/NP12/NP13/NP15/MPar0/MPar1/MPar2/MPar3/)+NP15(NP0/NP1/NP2/NP3/NP4/NP5/NP6/NP7/NP8/NP9/NP10/NP11/NP12/NP13/NP14/MPar0/MPar1/MPar2/MPar3/)+MPar0(NP0/NP1/NP2/NP3/NP4/NP5/NP6/NP7/NP8/NP9/NP10/NP11/NP12/NP13/NP141/NP15/MPar1/MPar2/MPar3/)+MPar1(NP0/NP1/NP2/NP3/NP4/NP5/NP6/NP7/NP8/NP9/NP10/NP11/NP12/NP13/NP14/NP15/MPar0/MPar2/MPar3/)+MPar2(NP0/NP1/NP2/NP3/NP4/NP5/NP6/NP7/NP8/NP9/NP10/NP11/NP12/NP13/NP14/NP15/MPar0/MPar1/MPar3/)+MPar3(NP0/NP1/NP2/NP3/NP4/NP5/NP6/NP7/NP8/NP9/NP10/NP11/NP12/NP13/NP14/NP15/MPar0/MPar1/MPar2)))

In equation A.6, "/" represents the compliment or "NOT" of preceding bit. Logic circuits can directly implement Equation A.6. An alternate method uses syndrome logic 362, a "Modified" Wallace tree adder 364, and circuit logic 366 as shown in FIGS. 4, 5, and 6 which respectively implement the logic shown in equations A.7, A.8, and A.9.

Equation A.7:

| | |
|---|---|
| SYN = | (s0 + s1 + s2 + s3 + s4 + s5 + s6 + s7 + s8 + s9 + s10 + s11 + s12 + s13 + s14 + s15) |

Equation A.8:

| | |
|---|---|
| Z0 = | NP0 xor NP1 xor NP2 |
| CO0 = | NP0 NP1 + NP0 NP2 + NP1 NP2 |
| Z1 = | NP3 xor NP4 xor NP5 |
| CO1 = | NP3 NP4 + NP3 NP5 + NP4 NP5 |
| Z2 = | NP6 xor NP7 xor NP8 |
| CO2 = | NP6 NP7 + NP6 NP8 + NP7 NP8 |
| Z3 = | NP9 xor NP10 xor NP11 |
| CO3 = | NP9 NP10 + NP9 NP11 + NP10 NP11 |
| Z4 = | NP12 xor NP13 xor NP14 |

-continued

| | |
|---|---|
| CO4 = | NP12 NP13 + NP12 NP14 + NP13 NP14 |
| Z5 = | NP15 xor MPar0 xor MPar1 |
| CO5 = | NP15 MPar0 + NP15 MPar1 + MPar0 MPar1 |
| Z6 = | MPar2 xor MPar3 |
| CO6 = | MPar2 MPar3 |
| Z7 = | Z0 xor Z1 xor Z2 |
| CO7 = | Z0 Z1 + Z0 Z2 + Z1 Z2 |
| Z8 = | Z3 xor Z4 xor Z5 |
| CO8 = | Z3 Z4 + Z3 Z5 + Z4 Z5 |
| Z9 = | Z7 xor Z8 xor Z6 |
| CO9 = | Z7 Z8 + Z7 Z6 + Z8 Z6 |

Equation A.9:

| | |
|---|---|
| ME = | (CO0 + CO1 + CO2 + CO3 + CO4 + CO5 + CO6 + CO7 + CO8 + CO9 + Not (Z9)) (SYN) |

I claim:

1. A method for detecting multiple errors in a code, the method comprising:

generating a syndrome from the code, wherein the syndrome indicates whether the code contains an error;

generating a plurality of pointer signals from the syndrome, each pointer signal being associated with a group from a plurality of N-bit groups in the code, wherein if only one of the groups in the code contains an error, the pointer signal associated with that group indicates that the group contains an error; and asserting a signal indicating multiple errors in response to the syndrome indicating the code contains an error and more than one of the pointer signals indicating that its associated group contains an error.

2. The method of claim 1, wherein asserting the signal indicating multiple errors comprises:

applying the pointer signals to input terminals of adders which are connected to form a tree, wherein each adder in the tree has a first output terminal and a second output terminal which provide bits in a multi-bit signal representing a sum of 1-bit values provided by signals applied to the input terminals of the adder, the first output terminal providing a least significant bit of the sum; and asserting the signal indicating multiple errors in response to a signal on the second output terminal of any of the adders representing a value one.

3. The method of claim 2, wherein the first output terminal of each adder except a last adder in the tree is coupled to an input terminal of another adder in the tree.

4. The method of claim 3, wherein asserting the signal indicating multiple errors further comprises asserting the signal indicating multiple errors in response to a signal on the first output terminal of the last adder providing a bit of value zero while the syndrome indicates the code contains an error.

5. The method of claim 1, wherein the code is a single byte error correcting-double byte error detecting code.

6. The method of claim 1, wherein each group in the code is a nibble.

7. A circuit for detecting errors in a coded digital signal, the circuit comprising:

a syndrome generator adapted to generate a syndrome signal which indicates whether the coded digital signal contains an error;

pointer logic adapted to generate pointer signals from the syndrome signal, wherein the pointer signals correspond to groups of bits in the coded digital signal, and if in the coded digital signal, only one of the groups of bits contains an error then a pointer signal which corresponds to that group indicates that the group contains an error; and a multi-error detector coupled to receive the syndrome signal and the pointer signals, wherein in response to the syndrome signal indicating the coded digital signal contains an error and more than one of the pointer signals indicating that a corresponding group contains an error, the multi-error detector asserts a signal indicating multiple errors.

8. The circuit of claim 7, wherein the multi-error detector comprises:

a tree of adders, wherein:

each adder has input terminals, a first output terminal, and a second output terminal, the first output terminal and the second output terminal providing bits of a multi-bit signal representing a sum of 1-bit values asserted to the input terminals, wherein the first output terminal provides a least significant bit of the sum; and each adder except a last adder in the tree has its first output terminal coupled to an input terminal of another adder in the tree, the pointer signals being asserted to other input terminals of the adders; and logic coupled to the adders, wherein the logic uses a signal on the first terminal of the last adder and signals from the second terminals of the adders in the tree to determine whether the signal indicating multiple errors should be asserted.

9. The circuit of claim 8, further comprising a data error correction circuit coupled to the pointer logic, wherein the data error correction circuit uses the pointer signals to identify a group of bits containing an error.

10. The circuit of claim 7, wherein the pointer logic generates pointer signals corresponding to data in the coded digital signal and pointer signals corresponding to check bits in the coded digital signal.

11. The circuit of claim 7, wherein the multi-error detector comprises:

a tree of adders, wherein the pointer signals are asserted to input terminals of at least some of the adders, and each of the adders has a first output terminal and a second output terminal which provide bits in a multi-bit signal representing a sum of 1-bit values asserted to the input terminals of the adder, the first output terminal providing a least significant bit of the sum; and logic coupled to the adders, wherein the logic asserts the signal indicating multiple errors in response to the second output terminal of an adder in the tree providing a bit of value one.

12. The circuit of claim 11, wherein each adder except a last adder in the tree has its first output terminal coupled to an input terminal of another adder in the tree.

13. The circuit of claim 12, wherein the multi-error detector further comprises logic which asserts the signal indicating multiple errors in response to the first output terminal of the last adder providing a bit of value zero and the syndrome signal indicating the coded digital signal contains an error.

14. The circuit of claim 7, wherein the coded digital signal represents a single byte error correcting-double byte error detecting code.

15. A circuit for detecting if only one of N bits is set, the circuit comprising:

a tree of adders, wherein:

the N bits are applied to input terminals of at least some of the adders;

each adder has a first output terminal and a second output terminal which provide bits of a multi-bit signal representing a sum of 1-bit values asserted to the input terminals, wherein the first output terminal provides a least significant bit of the sum; and each adder except a last adder in the tree has its first output terminal coupled to an input terminal of another adder in the tree; and logic which uses the signals on the output terminals of the adders to generate a signal indicating whether only one of the N bits is set.

16. The circuit of claim 15, wherein each adder in the tree has three input terminals and is capable of adding three one bit values.

17. The circuit of claim 15, wherein the circuit constitutes an exclusive OR gate having N inputs.

18. The circuit of claim 15, wherein each adder has no more than two output terminals for providing the multi-bit signal representing the sum of 1-bit values.

19. The circuit of claim 18, wherein in response to the first terminal of the last adder providing a bit with value one and all of the second terminals of the address providing bits with value zero, the logic coupled to the adders asserts the signal to indicate only one of the N bits is set.

20. The circuit of claim 15, wherein in response to the first terminal of the last adder providing a bit with value one and all of the second terminals of the address providing bits with value zero, the logic which uses the signals on the output terminals of the adders asserts the signal to indicate only one of the N bits is set.

21. A method for detecting multiple errors in a code, the method comprising:

generating a plurality of pointer signals, each pointer signal being associated with a group from a plurality of N-bit groups in the code, wherein if only one of the groups in the code contains an error, the pointer signal associated with that group indicates that the group contains an error;

applying the pointer signals to input terminals of adders which are connected to form a tree, wherein each adder in the tree has a first output terminal and a second output terminal which provide bits in a multi-bit signal representing a sum of 1-bit values provided by signals applied to the input terminals of the adder, the first output terminal providing a least significant bit of the sum; and asserting a signal indicating multiple errors in response to a signal on the second output terminal of any of the adders representing a value one.

22. The method of claim 21, wherein the first output terminal of each adder except a last adder in the tree is coupled to an input terminal of another adder in the tree.

23. The method of claim 22, further comprising generating a syndrome from the code, wherein the syndrome indicates whether the code contains an error; and asserting the signal indicating multiple errors in response to a signal on the first output terminal of the last adder providing a bit of value zero while the syndrome indicates the code contains an error.

24. A circuit for detecting errors in a coded digital signal, the circuit comprising:

pointer logic adapted to generate pointer signals which correspond to groups of bits in the coded digital signal, wherein if in the coded digital signal, only one of the groups of bits contains an error then a pointer signal which corresponds to that group indicates that the group contains an error; and a tree of adders, wherein the pointer signals are asserted to input terminals of at least some of the adders, and each of the adders has a first output terminal and a second output terminal which provide bits in a multi-bit signal representing a sum of 1-bit values asserted to the input terminals of the adder, the first output terminal providing a least significant bit of the sum; and logic coupled to the adders, wherein the logic uses output signals from the second terminals of the adders in the tree to determine whether a signal indicating multiple errors should be asserted.

25. The circuit of claim 24, wherein each adder in the tree except a last adder in the tree has its first output terminal coupled to an input terminal of another adder in the tree.

26. The circuit of claim 25, further comprising a syndrome generator adapted to generate a syndrome signal which indicates whether the coded digital signal contains an error, wherein the logic is further coupled to the syndrome generator and asserts the signal indicating multiple errors in response to the first output terminal of the last adder providing a bit of value zero and the syndrome signal indicating the coded digital signal contains an error.

27. The circuit of claim 24, further comprising a data error correction circuit coupled to the pointer logic, wherein the data error correction circuit uses the pointer signals to identify a group of bits containing an error.

* * * * *